United States Patent
Liu et al.

(10) Patent No.: US 6,954,238 B2
(45) Date of Patent: Oct. 11, 2005

(54) BACKLIGHT MODULE FOR HOMOGENIZING THE TEMPERATURE OF A FLAT PANEL DISPLAY DEVICE

(75) Inventors: Chen-Hua Liu, Taipei (TW); Jui-Chuan Chang, Taipei (TW); Kuo-Chung Lee, Hsin-Chu (TW); Kai-Yu Sun, Hsin-Chu Hsien (TW)

(73) Assignee: AU Optronics Corp., Hsinchu (TW)

( * ) Notice: Subject to any disclaimer, the term of this patent is extended or adjusted under 35 U.S.C. 154(b) by 148 days.

(21) Appl. No.: 10/078,663

(22) Filed: Feb. 21, 2002

(65) Prior Publication Data

US 2002/0113919 A1 Aug. 22, 2002

(30) Foreign Application Priority Data

Feb. 21, 2001 (TW) .......................... 90103982 A

(51) Int. Cl.⁷ ................. G02F 1/1335; G02F 1/1333; F21V 7/04
(52) U.S. Cl. ............... 349/65; 349/58; 349/67; 349/161; 362/31
(58) Field of Search ............... 349/58, 61–65, 349/67, 70, 161; 362/31

(56) References Cited

U.S. PATENT DOCUMENTS

| | | | | |
|---|---|---|---|---|
| 5,044,734 A | * | 9/1991 | Sperl et al. ............ | 349/67 |
| 5,146,354 A | * | 9/1992 | Plesinger ............... | 349/59 |
| 5,666,172 A | * | 9/1997 | Ida et al. ................ | 349/58 |
| 5,742,366 A | * | 4/1998 | Imoto .................... | 349/62 |
| 5,773,796 A | * | 6/1998 | Singer et al. ........... | 219/470 |
| 6,016,175 A | * | 1/2000 | Kim ....................... | 349/58 |
| 6,545,732 B2 | * | 4/2003 | Nakano .................. | 349/58 |
| 2001/0013911 A1 | * | 8/2001 | Kim ....................... | 349/65 |

FOREIGN PATENT DOCUMENTS

| | | | | |
|---|---|---|---|---|
| JP | 55-95937 A | * | 7/1980 | |
| JP | 8-136918 | | 5/1996 | |
| JP | 9-218404 | | 8/1997 | |
| JP | 10-106329 | * | 4/1998 | |
| JP | 11-39915 A | * | 2/1999 | |
| JP | 11154406 | | 6/1999 | |
| JP | 11202800 | | 7/1999 | |
| JP | 10222088 | | 8/1999 | |
| JP | 2000-092415 | | 3/2000 | |
| JP | 2001-35233 A | * | 2/2001 | |

* cited by examiner

Primary Examiner—Tarifur R. Chowdhury
(74) Attorney, Agent, or Firm—Bacon & Thomas, PLLC

(57) ABSTRACT

A flat panel display or a backlight module for homogenizing temperature distribution. The backlight module utilizes a heat pipe to carry out the heat from the light source quickly and homogenizes the distribution of temperature of the light source.

10 Claims, 1 Drawing Sheet

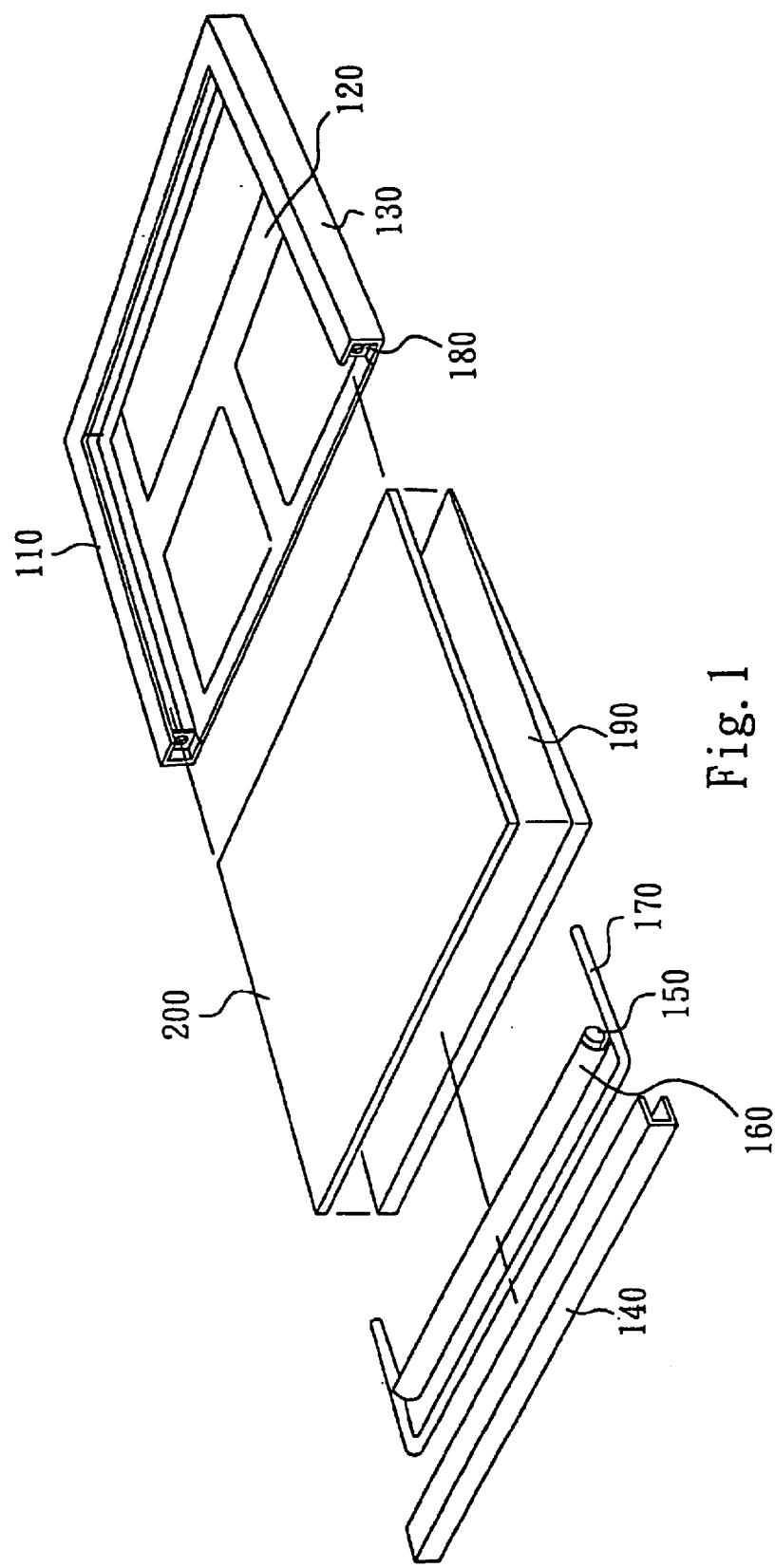

BACKLIGHT MODULE FOR HOMOGENIZING THE TEMPERATURE OF A FLAT PANEL DISPLAY DEVICE

BACKGROUND OF THE INVENTION

1. Field of the Invention

The present invention relates to a flat panel display device or a backlight module and, more particularly, to a flat panel display device or a backlight module by using a heat pipe to homogenize the temperature of the flat panel display device.

2. Description of Related Art

Flat panel display devices are popular in recent years. Many flat panel display devices (e.g. liquid crystal display devices) are mounted with light sources (e.g. CCFLs or LEDs) or backlight modules for providing light for displaying images in dark environments. However, the heat produced from the light sources or backlight modules results in another problem for the display quality of the flat panel display devices.

In most cases, a backlight module for a flat panel display device includes a reflector, a light source and a lightguide. The light source (e.g. a CCFL (cold cathode fluorescent lamp)) often locates in the cavity of the reflector to reflect the light from the light source to the lightguide of the backlight module. However, this kind of arrangement often causes deterioration of the display quality of flat display panel devices since the distribution of the temperature on the lightguide or the reflector is not homogeneous. For most traditional backlight module, the heat produced from the light source (e.g. the cold cathode fluorescent lamp) is released out by radiating heat from light sources to the reflector, by convecting of air inside the reflector, and through the conduction of heat through the metal frames covering the edges of the flat panel display devices. Since the heat resistance for this kind of heat releasing is high, the distribution of the temperature on the light source or the lightguide is not homogeneous. Taking CCFL for example, the temperature of the area close to the ends of the CCFL with high electric voltage is relatively higher than that of the other part of the CCFL. The temperature distribution of the whole lamp is not homogeneous. Therefore, the lifetime of the light source is shortened. The distribution of light on the lightguide is not homogeneous, either (since the temperature on the lightguide is not homogeneous). In addition, the high temperature also deteriorate the quality of the parts (e.g. the polarizer film) and shorten the lifetime of the parts close to the light source. Therefore the reliability is of the flat panel display device lowered and the lifetime of the flat panel display devices is shortened.

Therefore, it is desirable to provide an improved flat panel display device or a light module for a flat panel display device to mitigate and/or obviate the aforementioned problems.

SUMMARY OF THE INVENTION

The object of the present invention is to provide a backlight module to improve the temperature distribution of the light source and the lightguide, and to slow down the aging effect of the parts of the backlight module.

Another object of the present invention is to provide a flat panel display for homogenizing the distribution of the temperature of the light and the lightguide to improve the display quality of the flat display panel, to increase the efficiency of the light source and to improve the lightness of the light source.

Another object of the present invention is to provide a method for homogenizing the distribution of the temperature of the flat panel display, to improve the display quality of the flat display panel, increase the efficiency of the light source and to improve the lightness of the light source.

To achieve the object, the flat display panel device of the present invention includes: a display panel; a light source for providing light to said display panel; a reflector having a cavity for locating the light source and reflecting the light from the light source; a heat pipe located on one side of the light source and the reflector is located between the heat pipe and the light housing; a housing having at least a cavity for locating the display panel and the lightguide.

The backlight module for the flat panel display device of the present invention includes at least a light source; a reflector having a cavity for locating the light source and reflecting the light from the light source; and a heat pipe located on one side of the light source, and the reflector is located between the heat pipe and the light source.

The method for homogenizing the temperature of a backlight module of a flat panel display, comprising following steps: providing a display panel; and combining a backlight module with said display panel; wherein said backlight module comprises at least a light source; a reflector having a cavity for locating said light source and reflecting the light from said light source; and a heat pipe locating between said light source and said reflector to homogenize and remove the heat from said light source. The method for homogenizing the temperature of a backlight module of a flat panel display can selectively further includes to provide a housing having at least a cavity for locating said display panel and/or said backlight module.

Other objects, advantages, and novel features of the invention will become more apparent from the following detailed description when taken in conjunction with the accompanying drawings.

BRIEF DESCRIPTION OF THE DRAWINGS

FIG. 1 is a perspective view of one of the embodiment of the flat panel display devices of the present invention,

DETAILED DESCRIPTION OF THE PREFERRED EMBODIMENT

The heat pipe of flat panel display device of the present invention can be any conventional heat pipe. The heat pipe is a closed pipe with capillaries. Inside the heat pipe, there is filled with some recycled fluid (e.g. water) having low thermal resistance. The fluid (e.g. water) is evaporated as the heat is absorbed at the hot part of the heat pipe. The evaporated fluid (e.g. water) diffuses out to the cool part of the heat pipe. In most cases, the evaporated fluid (e.g. water) is condensed to fluid at the cool part of the heat pipe. The cooled fluid flows back to the hot part through the assistance of capillaries. Through the cycle of the fluid inside the heat pipe, heat can be carried out and the distribution of the temperature can be homogenized. The heat pipe sometimes is called micro heat pipe or micropipe. The length of the heat pipe of flat panel display device of the present invention is not limited. Preferably, the length of the heat pipe of flat panel display device of the present invention is longer than that of the reflector or the light source. In the present invention, the end of the heat pipe is preferred to locate between the frames (e.g. the front frame, the side frame or the bottom frame) and the lightguide of flat panel display device of the present invention. The materials of the heat pipe of flat panel display device of the present invention can be any material for conventional heat pipe. In the embodiment of the present invention, the heat pipe is purchased from Thermal Core Inc.

The housing of the flat panel display device of the present invention can be any conventional housing for the flat panel display devices. Preferably, the housing of the flat panel display device of the present invention is a housing including a front frame for enveloping or covering at least partial edges of said display panel; a bottom frame for protecting said display panel; a side frame sandwiched between the front frame and the bottom frame; and a closing frame having a cavity for locating the reflector, the light source and the heat pipe; wherein the side frame is integrated with the front frame and the bottom frame to form a cavity to locate said display panel and/or the lightguide. Most preferably, the side frame of the housing of the flat panel display device of the present invention is integrated with the front frame and the bottom frame of the flat panel display device of the present invention to form a cavity and a opening for the cavity to slide in or slide out the display panel and the lightguide. The material for the frames (e.g. the front frame, the side frame or the bottom frame) of the flat panel display device of the present invention can be any conventional material. Preferably, the frame (e.g. the front frame, the side frame or the bottom frame) of the flat panel display device of the present invention is made by plastic or metal. Most preferably, the frame (e.g. the front frame, the side frame or the bottom frame) is made by metal. The bottom frame of the flat panel display device of the present invention can be any conventional shape. Preferably, the bottom frame of the flat panel display device of the present invention is a plate with or without openings. The closing frame is combined with the frames (e.g. the front frame, the side frame or the bottom frame) by at least one binding units. Any conventional binding unit can be used to combine the closing frame and other frames (e.g. the front frame, the side frame or the bottom frame) of the flat panel display device of the present invention. Preferably, the binding unit is a male/female docketing unit or screws. The end of the heat pipe of the flat panel display device of the present invention can be fixed with the frames (e.g. the front frame, the side frame or the bottom frame) through a mounting unit. The mounting unit is preferred to be a heat-conducting rubber unit or a heat-conducting rubber cushion. The shape of the heat pipe of the flat panel display device of the present invention can be any conventional shape. Preferably, the heat pipe of the flat panel display device of the present invention is a linear pipe. The heat pipe of the flat panel display device of the present invention is arranged between the light source and the closing-frame or between the reflector and the closing-frame to carry out the heat quickly. The heat from the light source can be transferred to the frames (e.g. the front frame, the side frame or the bottom frame) of the flat panel display device of the present invention through the heat pipe. Therefore, the heat can be released out through frames of the flat panel display device of the present invention quickly. On the other hand, since the heat-releasing efficiency of the heat pipe is high, the temperature distribution of the light source, the lightguide, and the reflector can be homogeneously. In other words, the heat pipe of the backlight module or the flat panel display homogenized the temperature distribution of the backlight module or the flat panel display.

The flat panel display device of the present invention can be any conventional flat panel display Preferably, the flat panel display device is a liquid crystal display device. The light source of the flat panel display device of the present invention can be any conventional source for a flat panel display device. Preferably, the light source of the flat panel display device of the present invention is a cold cathode fluorescent lamp (CCFL) or a LED. The backlight module of the present invention can be arranged on any side of a flat panel display to provide enough light for the flat panel display. In other words, the backlight module of the present invention can be arranged in and adequate position to work as a back side light source or as a front side light source for a flat panel display.

With reference to FIG. 1, there is shown the flat panel display device of the present embodiment. The flat panel display device of the present embodiment is a liquid crystal display device. The flat panel display device comprises a liquid crystal display panel 200, a backlight module and a housing. The backlight module of the present embodiment includes a lightguide 190, a reflector 160, a heat pipe 170 (or called microheat pipe) and a cold cathode fluorescent lamp (CCFL) 150 (i.e. a light source). The reflector 160 has a cavity for locating the CCFL 150, Inside the inner surface of the reflector 160, it is coated a layer of reflecting material to reflect the light into the lightguide 190. The reflector 160 and the CCFL 150 is mounted on one side of the lightguide 190 to provide enough light to the lightguide 190 and the liquid crystal display panel 200.

The housing of the flat panel display is includes a closing-frame 140, a side frame 130, a front frame 110 and a bottom frame 120. The side frame 130, the front frame 110 and the bottom frame 120 are integrated to form a cavity to locate the liquid crystal display panel 200 and the lightguide 190. The side frame 130 is sandwiched between the front frame 110 and the bottom frame 120. The front frame 110 is about parallel to the bottom frame 120. The side frame 130, the front frame 110 and the bottom frame 120 also form an opening for sliding the lightguide 190, the liquid crystal display panel 200 or the backlight module. The front frame 110 has at least an opening to allow the light of the active area of the liquid crystal display panel 200 to come out. The peripheral area liquid crystal display panel 200, i.e. the area close to the edges of liquid crystal display panel 200, is covered by the front frame 110 to prevent further leaking of light. The closing-frame 140 is a frame having a cross-section of "-shape" and a cavity. The cavity of the closing-frame 140 is big enough to locate the heat pipe 170 (or a micro-heat pipe), the reflector 160 and the CCFL 150. The heat pipe 170 (or a micro-heat pipe) locates between the lightguide 190 and the closing frame 140 to carry out heat from the CCFL 150 (the light source) and homogenize the temperature of the CCFL 150 and the lightguide 190. In the present embodiment, the heat pipe 170 locates between the closing-frame 140 and the reflector 160 to homogenize the temperature. The ends of the heat pipe 170 extend into the cavity between the side frame 130 and the lightguide 190. The heat pipe 170 between the side frame 130 and the lightguide 190 is mounted on the frames (e.g. the side frame 130, the front frame 110 or the bottom frame 120) through conductive rubber cushions 180 to help releasing out the heat to the frames (e.g. the side frame 130, the front frame 110 or the bottom frame 120). Because of the evaporation effect and the capillary effect of the water in the heat pipe 170, the heat pipe 170 carry out the heat from the CCFL 150 (i.e. the light source) to the frames (e.g. the side frame 130, the front frame 110 or the bottom frame 120) effectively and quickly. Therefore, the heat from the CCFL 150 can be homogenized and carried out through the heat pipe 170 and the frames (e.g. the side frame 130, the front frame 110 or the bottom frame 120) very quickly. Therefore, the temperature of the CCFL 150 (light source) can be lowered very quickly. In addition, the closing-frame 140 can combine with the other frames (e.g. the side frame 130, the front frame 110 or the bottom frame 120) through any traditional binding unit. In the present embodiment, the closing-frame combines with other frames through screws.

Through the assistance of the heat pipe, the heat produced from the light source of the backlight module can be carried out quickly and distributed homogeneously, Therefore, the distribution of the temperature on the light source and the lightguide can be much homogeneously. Therefore, the aging of the parts close to the edge of the lightguide or the light source can be slow down. The efficiency of the light source can be improved a lot since the temperature distribution is much more even. The display quality can be improved since the temperature distribution on the lightguide is improved. On the other hand, since the backlight module and the flat panel display devices are slid into the housing as they are assembled together, the assembling of the flat panel display device becomes much more easier. The cost for the materials and tehe time for assembling can be saved greatly Although the present invention has been explained in relation to its preferred embodiment, it is to be understood that many other possible modifications and variations can be made without departing from the spirit and scope of the invention as hereinafter claimed.

What is claimed is:

1. A flat panel display device, comprising:
   a display panel;
   a light source for providing light to said display panel;
   a reflector having a cavity for locating said light source and reflecting the light from said light source;
   a heat pipe located on one side of said light source with capillary structure for effectively homogenizing and carrying out heat from said light source;
   a lightguide for transferring said light from said light source to said display panel; and
   a housing having a front frame for enveloping or covering at least partial edges of said display panel, a bottom frame for protecting said display panel, a side frame sandwiched between said front frame and said bottom frame, and a closing frame having a cavity for locating said reflector, said light source and said heat pipe;
   wherein said side frame is integrated with said front frame and said bottom frame to form a cavity to locate said display panel and/or said lightguide, said reflector is located between said heat pipe and said light source, and at least one end of said heat pipe locates between said side frame and said display panel.

2. The flat display panel device as claimed in claim 1, wherein said heat pipe is connected with said side frame, said bottom frame or said front frame through heat-conducting rubber.

3. The flat display panel device as claimed in claim 1, wherein said flat display panel is a liquid crystal display panel.

4. A method for homogenizing the temperature of a backlight module of a flat panel display device, comprising following steps:

providing a display panel; and
combining a backlight module with said display panel; wherein said backlight module comprises at least a light source; a reflector having a cavity for locating said light source and reflecting the light from said light source; and a heat pipe located on one side of said light source with a capillary structure to homogenize and remove the heat from said light source; wherein said reflector is located between said heat pipe and said light source;
providing a housing having a front frame for enveloping or covering at least partial edges of said display panel, a bottom frame for protecting said display panel, a side frame sandwiched between said front frame and said bottom frame, and a closing frame having a cavity for locating said reflector, said light source and said heat pipe, wherein said side frame is integrated with said front frame and said bottom frame to form a cavity to locate said display panel and/or said lightguide, said heat pipe locates between said reflector and said closing frame, and at least one end of said heat pipe locates between said side frame and said display panel; and
combining said housing and said backlight module together; wherein at least one end of said heat pipe locates between said side frame and said display panel.

5. The method as claimed in claim 4, wherein said light source locates between said display panel and said heat pipe.

6. The method as claimed in claim 4, wherein said display panel is a liquid crystal display panel.

7. A flat panel display, comprising:
   a display panel;
   at least a light source for providing light to said display panel;
   a lightguide for transferring said light from said light source to said display panel;
   a heat pipe;
   a reflector having a cavity for locating said light source and being located between said heat pipe and said light source; and
   a housing having a front frame, a bottom frame, a side frame, and a closing frame, said closing frame having a cavity for locating said reflector, said light source and said heat pipe;
   wherein said side frame is integrated with and between said front frame and said bottom frame to form a cavity for locating said display panel and said lightguide and an opening for said cavity, to slide in or slide out said display panel and said lightguide.

8. The flat panel display as claimed in claim 7, wherein said heat pipe is connected with said housing througha heat-conducting rubber.

9. The flat panel display as claimed in claim 7, wherein said heat pipe is an U shape heat pipe.

10. The flat panel display as claimed in claim 7, wherein said display panel is a liquid crystal display panel.

* * * * *